March 9, 1926.　　　　　　　　　　　　　　　　1,576,021
O. ARAM
REFRACTORY BRICK FOR FURNACE LININGS
Filed Sept. 14, 1922

O. Aram
INVENTOR

BY D. C. Davis
ATTORNEY

Patented Mar. 9, 1926.

1,576,021

UNITED STATES PATENT OFFICE.

OTTO ARAM, OF PHILADELPHIA, PENNSYLVANIA.

REFRACTORY BRICK FOR FURNACE LININGS.

Application filed September 14, 1922. Serial No. 588,242.

*To all whom it may concern:*

Be it known that I, OTTO ARAM, a citizen of the United States, and a resident of Philadelphia, in the county of Philadelphia and State of Pennsylvania, have invented a new and useful Improvement in Refractory Bricks for Furnace Linings, of which the following is a specification.

This invention relates to furnaces and particularly to the art of making highly refractory fire brick and furnace linings for high-temperature furnaces, and has for an object to provide for use in connection with apparatus of the character designated a novel method of treating fire brick which shall make such brick highly resistant to deterioration under high temperatures and to erosion from heated gas movements, and which shall also be relatively non-adhesive with respect to fused silica and other oxides commonly encountered in high-temperature furnace operation. It has for a further object to provide a novel method for lengthening the life of refractory furnace linings and keeping down the cost of furnace repairs by applying an intimate protective coating to the interior surfaces of the furnace walls. It has for a still further object to provide for apparatus of the character designated fire bricks having the surfaces which are to be exposed to the hot products of combustion so treated as to minimize deterioration, check erosion and eliminate accretions thereto of fused ash.

Figure 1:
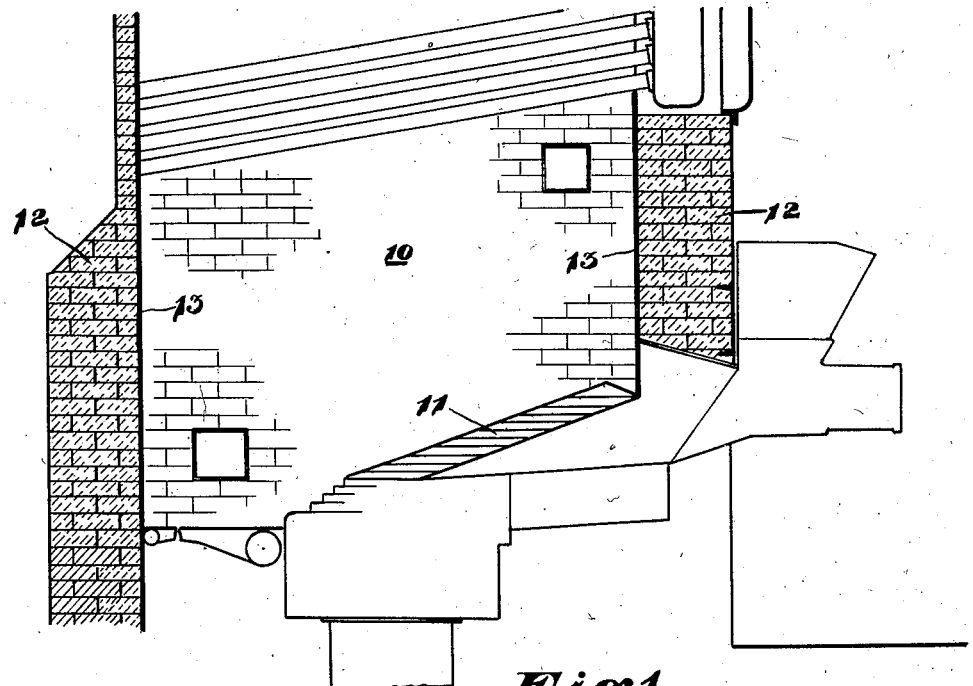
Figure 2:
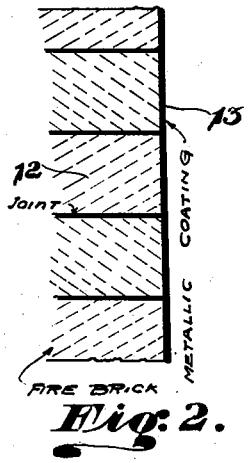
Figure 3:
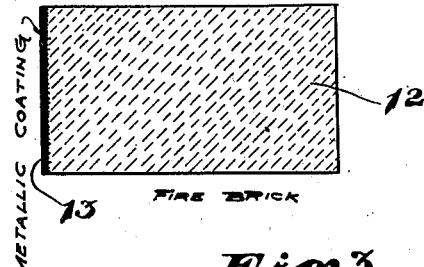

These and other objects are made more manifest in the further description of my invention, reference being had to the accompanying drawings in which Fig. 1 is a sectional view of a well known type of high duty furnace to which my invention may be advantageously applied; Fig. 2 is an enlarged detail view of a section of the furnace wall; and Fig. 3 is a view in section of a fire brick treated in accordance with my improved method.

It is a well recognized fact that fire brick having a high percentage of alumina ($Al_2O_3$) have an extremely high fusing point. A brick made entirely of alumina, however, does not have sufficient strength for use in furnace walls, and, consequently fire brick are commonly made of a mixture composed chiefly of alumina and silica in varying portions. Clinker or ashes in a molten state act as fluxes to the refractory material of fire brick and their contents of iron, calcium, and magnesium oxide and alkaline compounds, and react upon the fire brick, lowering the fusing point thereof to a considerable degree, and hence are very destructive to furnace linings. Further, the removal of accretions from furnace lining frequently results in scaling of the exposed surfaces of the brick.

By experimentation, I have found that a coating of aluminum on the exposed surfaces of fire brick closes the pores of the refractory material and, when subjected to high heats, forms a surface coating consisting largely of alumina. This acts as a protective coating for the fire brick, lengthening the life of the refractory furnace lining by keeping off the destructive effects of the fluxes in the ashes, by resisting erosion of the furnace gases and by presenting a surface non-adhesive with respect to the products of combustion. The furnace lining is consequently kept in good condition at low cost of maintenance.

The surface coating of aluminum may be applied to the fire brick in any well known process of coating either before the brick are laid up in the furnace wall or after the furnace wall has been constructed. The surface coating should, however, be preferably intimately associated with and completely fill the pores of the refractory material of the brick.

A satisfactory process of coating the brick, particularly where the coating is applied to the assembled wall, consists of applying a metallic aluminum coating by means of the well known metal spray gun. The coating thus obtained is continuous, may be of any desired depth and is exceedingly intimate. Other processes of coating may also be employed. Where the fire brick are treated before being laid up in the furnace wall, they may be dipped in metallic aluminum, or electrolytic means for depositing the metallic aluminum coating on the fire brick may be employed.

In any of the above processes, the aluminum forms a continuous coating which enters the pores of the refractory material of the fire bricks and serves to anchor the coating upon the brick. There is thus provided a surface layer which is free from chipping or scaling, which entirely excludes the contact of the heated furnace products from contact with the refractory material of the brick, and to which the fused clinker and ash does not adhere.

In Figs. 1 and 2 of the drawings, I show a furnace 10, having a grate of conventional type 11, and an enclosing wall 12 of fire brick such as are ordinarily used in high duty furnaces. A coating of aluminum is designated at 13. All the surfaces of the furnace with which either the gaseous or solid products of combustion come in contact are preferably coated with the protective layer of aluminum. In Fig. 3, I show a brick to which the coating has been applied. This is one form of the product resulting from the process set forth in this application. As a product, the fire brick may be marketed with a coating of metallic aluminium on surfaces which are designed for exposure to the interior of the furnace.

It is to be understood that the above described fire bricks and the methods of applying protective coatings thereto are merely illustrative of my inventive idea, and that the invention is not limited to any specific kind of fire brick or to any special method of coating the brick. The essence of the invention consists in a method of increasing the life of fire brick by providing a protective coating of a material having high refractory properties, resistant to erosion and non-adhesive with respect to fused clinker and ash, and also in the surface-coated brick and furnace lining which results from this process.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. The method of lengthening the life of refractory linings of high temperature furnaces which comprises applying to exposed surfaces of the refractory lining a superficial coating consisting largely of metallic aluminum.

2. In the art of making refractory bricks, the method which comprises coating an exposed face of a brick with metallic aluminum, the brick being composed of a substance which will combine with the aluminum to form a highly refractory material.

3. In the art of making refractory bricks, the method which comprises making a fire brick composed largely of alumina and silica, and applying to an exposed face of the brick an intimate coating consisting largely of metallic aluminum.

In testimony whereof, I have hereunto subscribed my name this 11th day of September, 1922.

OTTO ARAM.